(12) United States Patent
Elkind

(10) Patent No.: US 9,321,644 B2
(45) Date of Patent: Apr. 26, 2016

(54) SEPARATING HYDROGEN FROM DISASSOCIATED WATER

(71) Applicant: Stellar Generation, Inc., Dallas, TX (US)

(72) Inventor: Jerome Lee Elkind, Dallas, TX (US)

(73) Assignee: Stellar Generation, Inc., Dallas, TX (US)

( * ) Notice: Subject to any disclaimer, the term of this patent is extended or adjusted under 35 U.S.C. 154(b) by 0 days.

(21) Appl. No.: 14/201,554

(22) Filed: Mar. 7, 2014

(65) Prior Publication Data

US 2015/0251905 A1  Sep. 10, 2015

(51) Int. Cl.

| B01J 19/08 | (2006.01) |
|---|---|
| C01B 3/04 | (2006.01) |
| C01B 3/50 | (2006.01) |
| C01B 13/02 | (2006.01) |
| B01J 19/12 | (2006.01) |

(52) U.S. Cl.
CPC .......... *C01B 13/0207* (2013.01); *B01J 19/127* (2013.01); *C01B 3/042* (2013.01); *C01B 3/045* (2013.01); *C01B 3/501* (2013.01); *C01B 13/0251* (2013.01); *B01J 2219/00144* (2013.01); *B01J 2219/2423* (2013.01)

(58) Field of Classification Search
None
See application file for complete search history.

(56) References Cited

U.S. PATENT DOCUMENTS

| 4,696,809 A * | 9/1987 | Vialaron | C01B 3/045 |
|---|---|---|---|
| | | | 204/157.52 |
| 7,935,254 B2 * | 5/2011 | Kongmark | B01D 53/22 |
| | | | 210/321.64 |
| 7,943,045 B2 * | 5/2011 | Rohrich | B01D 53/22 |
| | | | 210/321.64 |
| 2007/0151857 A1 * | 7/2007 | Farrusseng | B01D 53/228 |
| | | | 204/639 |
| 2011/0052451 A1 | 3/2011 | Elkind | |

FOREIGN PATENT DOCUMENTS

| DE | 4302089 | 7/1994 | |
|---|---|---|---|
| GB | 1292025 A | * 10/1972 | ......... B01D 67/0055 |
| WO | 03/097524 | 11/2003 | |

OTHER PUBLICATIONS

International Search Report and Written Opinion of the International Searching Authority issued in International Application No. PCT/US2015/019464 on Jul. 7, 2015; 12 pages.
Etievant, Claude: "Solar High-Temperature Direct Water Splitting—A Review of Experiments in France"; Solar Energy Materials, Elsevier Science Publishers B.V. Amsterdam, NL; vol. 24, No. 1/04, Dec. 2, 1991; 28 pages.

* cited by examiner

*Primary Examiner* — Jennifer A Leung
(74) *Attorney, Agent, or Firm* — Fish & Richardson P.C.

(57) ABSTRACT

In some implementations, a system for producing hydrogen and oxygen from water includes a target, an oxygen selective membrane, a cooling chamber, and a hydrogen selective membrane. The target heats to at least a temperature that thermally decomposes water, receives water vapor, heats the received water vapor to the temperature that thermally decomposes water to form a heated vapor, and passes the heated vapor to an oxygen selective membrane. The oxygen selective membrane separates, at or near the temperature that thermally decomposes water, oxygen from the heated vapor to form a hydrogen-rich vapor. The cooling chamber cools the hydrogen-rich vapor to at least a specified temperature. The hydrogen selective membrane separates hydrogen in the hydrogen-rich vapor to leave substantially water vapor.

14 Claims, 2 Drawing Sheets

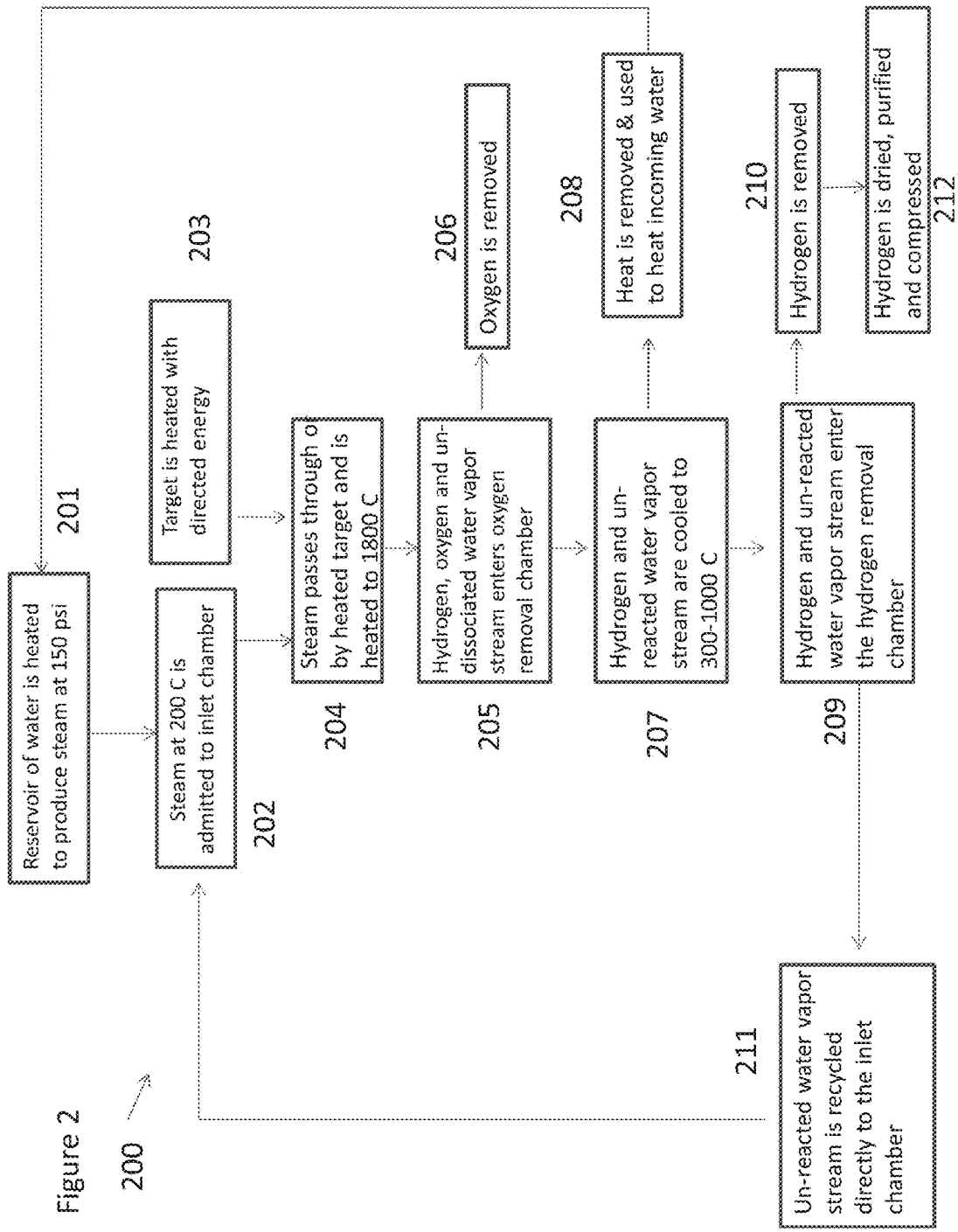

SEPARATING HYDROGEN FROM DISASSOCIATED WATER

TECHNICAL FIELD

This implementation relates to hydrogen production and, more particularly, to separating hydrogen from disassociated water.

BACKGROUND

On-going geo-political concerns, concerns for global warming, and rising oil prices are fueling the push for renewable energy sources such as wind and solar power. Today, the majority of the electricity generated in the United States is produced by burning fossil fuels, such as coal, natural gas, and petroleum, nuclear power and hydroelectric power. Energy produced from alternative energy sources, such as wind and solar power, account for a small percentage of the total electricity produced in the United States. Our reliance on fossil fuels and nuclear power has several drawbacks. While fossil fuels are comparatively inexpensive, there is only a limited supply of fossil fuels, which will eventually be depleted if alternative energy sources are not found. Further, the burning of fossil fuels to produce electricity emits greenhouse gases that contribute to global warming. Nuclear power presents environmental and nuclear proliferation hazards.

Solar energy and wind power are promising alternative energy sources that can reduce reliance on fossil fuels for generating electricity. Solar energy and wind power are renewable resources so there is no concern about future depletion of these resources. Further, the generation of electricity from solar energy and wind power does not emit greenhouse gases and is therefore considered more environmentally friendly. Also, generation of electricity from renewable energy sources does not generate hazardous by-products that need to be disposed of.

In the field of solar energy utilization, much work has been done to develop a system that is economical enough to replace the combustion of fossil fuels to supply the growing needs of our ever more highly populated planet in a clean and renewable way. Solar photovoltaic systems have received the most attention over the years and yet suffer from a very high cost of equipment. Even with government subsidies, 25 year payback periods are common. In addition, because electricity is very expensive to store, the use of periodic energy sources such as solar to produce electric power is problematic.

A better approach would be to use solar energy to produce a fuel, which could be stored and transported easily and economically. This fact has led to a great deal of research into ways to use sunlight to produce fuels from low energy feedstocks, most notably to produce hydrogen from water. This arises largely from the well-known fact that hydrogen, when used as a fuel produces only water, which truly makes hydrogen a "clean fuel" candidate. Despite the large body of work on this topic there is not yet an economical process in practice.

Electricity for electrolysis may come from renewable resources such as solar or wind, but ~60 kWhr is required to produce 1 kg of hydrogen from water electrolytically. This limitation renders this process too expensive to compete in the energy marketplace with fossil fuels.

Direct thermal decomposition of water has been proposed as a possible way to avoid the inefficiencies and expense of the photon-to-electron conversion step that limits the aforementioned solar electrolysis system approach. The follow formula illustrates the decomposition:

$$2H_2O + Heat \rightarrow 2H_2 + O_2 \qquad (1)$$

To generate thermal decomposition of water, very high temperatures are required to produce appreciable amounts of reaction products, i.e., hydrogen and oxygen. For example, at equilibrium, 2% of water decomposes at a temperature of 1800° C. and at a pressure of 760 Torr. This high temperature requirement imposes very strict requirements on reactor materials, because they are exposed to very high temperatures and very reactive gasses. Thermal shock and very large thermal gradients are also a concern because mismatches in thermal expansion coefficients among different construction materials can cause cracking and mechanical failure. Besides thermal and chemical stability, the direct thermal decomposition system should also be able to allow for the separation of the reaction products, oxygen and hydrogen from each other to avoid recombination.

In order to accomplish this separation, the gases must either be cooled rapidly and then separated later or separated when hot. Rapid cooling or quenching, while potentially effective at preventing recombination, also limits the process in 3 important ways. First, it limits how far the decomposition reaction may proceed to what is formed at equilibrium for a given temperature and pressure. Second, it inevitably results in significant heat loss during quenching as most of the water vapor remains unreacted and all of that unreacted water vapor must be cooled along with the product gases. Third, while hydrogen and oxygen may not spontaneously recombine while cool, this approach does present a gas mixture that can be very dangerous to work with.

Based on the above, separating the hydrogen and oxygen gases from each other while still at decomposition temperatures may be an attractive approach. This separation can be accomplished by using ceramic-based high temperature hydrogen permeable membranes and/or high temperature oxygen permeable membranes. As a result, work in this area has taken place, however successful implementation of a commercially successful system with sufficient robustness and gas throughput has not occurred.

Previously, two types of approaches have been attempted. In the first type, the separation of both products at or near decomposition temperatures has been attempted. This approach ultimately failed because, at the very high temperatures required, commercially viable (existing) hydrogen separation systems were unsuitable. In the second type, only oxygen was removed at decomposition temperatures, leaving hydrogen and water vapor to be separated later by a phase change, i.e., by cooling and condensing the water. The disadvantage of this type of approach is that, like the rapid quenching method, energy loss is excessive.

As described above, a dearth of suitable materials along with the challenges of energy efficiency associated with such a high temperature process has kept reaction (1) from becoming a commercially viable process for solar energy utilization. Indeed, the number of known materials that can function at such a temperature and in the required chemical environments is quite small. For example, graphite and silicon carbide possess exceedingly high melting points, but would themselves react upon exposure to hot oxygen according to the following reactions:

$$C + O_2 \rightarrow CO_2 + Heat \qquad (2)$$

$$SiC + 2O_2 \rightarrow SiO_2 + CO_2 + Heat \qquad (3)$$

Previous work has suggested that actively removing oxygen and hydrogen could drive reaction (1) to favor product formation thereby allowing for lower operating temperatures. While this is true, at temperatures where both hydrogen and oxygen permeable membranes are stable, the concentrations of products formed are typically too small. In order to create the gradient required to drive the separation of oxygen (e.g., at commercially relevant rates), hydrogen or hydrocarbons have to be consumed catalytically on the permeate side of the oxygen membrane. As a result, this approach is commercially self-defeating. In addition, schemes that separate only the oxygen and later use condensation of the remaining water vapor in order to recover hydrogen suffer from significant energy inefficiencies.

SUMMARY

The current implementation overcomes these limitations as follows:

First, the inlet water vapor pressure and target temperature are selected so as to produce enough of a partial pressure of oxygen during water decomposition so that a high temperature oxygen separation membrane can operate at commercially relevant flow rates, such as 1 standard cubic centimeter per minute (sccm) per squared centimeter of membrane surface area, while using only vacuum or sweep gas to drive the gradient. In these instances, consumption of the oxygen on the permeate side of the membrane can be substantially prevented or otherwise reduced, which can provide a renewable system. For example, according to equilibrium thermodynamics, at 1800° C. and 10 atm, approximately 1% of the water vapor passing through or by the target will decompose into hydrogen and oxygen. This vapor stream may provide the oxygen permeable membrane system with an oxygen partial pressure of approximately 38 Torr on the feed side. While this partial pressure is a small percentage of the total pressure, it is a high enough partial pressure to drive a commercially relevant oxygen flux through a high temperature oxygen permeable membrane, such as stabilized zirconia. In addition, a vacuum pump on the permeate side can economically sustain a sufficient oxygen pressure gradient across the membrane.

Second, once that stream has passed the oxygen separation area, the remaining vapor stream, which now contains approximately 98% water vapor and 2% hydrogen, is then cooled to a temperature more suitable for commercially available hydrogen separation systems. For example, a palladium-based membrane system, which generally pairs a metal that has a very high solubility of hydrogen, examples of which are tantalum, vanadium and niobium, with a thin, catalytically active surface coating of palladium, typically operates between 300° and 1000° C. depending on the exact composition of the palladium-based membrane. Another class of materials that could be used as hydrogen separation membranes is that of pure palladium as well as palladium alloys. Alternatively or in combination, certain combinations of ceramic and metal powders, such as palladium and alumina, appropriately processed and generally referred to as a "CERMET", could also be used as hydrogen separation membranes without departing from the scope of the present implementation. In addition, certain perovskites, such as $SrCe_{0.95}Yb_{0.05}O_3$, can be used as hydrogen separation membranes in this implementation. After hydrogen is removed from the stream, an inline fan, blower or compressor may then used to return the remaining water vapor back to the target for another pass through the system.

With each pass through the target, the oxygen separation region, and the hydrogen separation region, more and more of the original water vapor feedstock will be converted to hydrogen and oxygen and removed from the system. As the original water feedstock is depleted, water vapor can be periodically added to maintain the pressure at, for example, approximately 10 Atm. Some heat may be lost when cooling from about 1800° C. to about 600° C., which occurs between the oxygen and hydrogen separation membranes. However this loss represents a small percentage of the total energy input to heat the water and drive the reaction. In addition, much of this heat can be recovered by using a heat exchanger to preheat water vapor before it gets to the target. In summary, by performing water thermolysis at high temperature (e.g., approximately 1800° C.) and at high pressure (e.g., approximately 10 Atm), an oxygen partial pressure is produced that is sufficiently high to allow the use of commercially available membrane materials that are functional and stable at thermolysis temperatures and capable of supporting a commercially viable vacuum-driven separation rate, which can allow for a subsequent hydrogen separation at a lower temperature. Conventional vacuum-driven membrane systems can be used to remove both hydrogen and oxygen, which allows for a closed-loop vapor system substantially optimizing or otherwise increasing energy efficiency while reducing cost.

In some implementations, a method includes concentrating solar energy on an absorption element including a target, wherein the target is heated to about 1800° C. or greater. The absorption element is configured as a high-surface area nozzle and the included target heats the water vapor passing from an inlet chamber to an oxygen removal chamber to approximately 1800° C. The water vapor inside the system can be at a high pressure of, for example, approximately 7600 Torr or more, and contact with the heated target causes the disassociation of at least a portion of the water vapor to form a high-temperature fluid containing hydrogen, oxygen and unreacted water, which exits the absorption element. The oxygen is selectively removed from the high-temperature fluid through a multitude of membranes. As previously mentioned, under appropriate conditions, the membranes can selectively pass oxygen at high temperatures. In some implementations, each of the membranes is a tubular membrane with a porous ceramic support (e.g., alpha-alumina) with approximately 10-micron diameter pores and 30% overall porosity. The tubular membrane may have approximately a 4 mm outer diameter and a 3 mm inner diameter. In addition, the tubular membrane may be coated on one or more surfaces with a dense oxygen semi-permeable film (e.g., zirconia that has been stabilized with, for example, 8-molar percent yttria) that is approximately 10 microns thick. The oxygen semi-permeable film may be deposited on one or more of the inner or outer surfaces of the support. In some implementations, a tubular membrane module can include an assembly of tubes. In these instances, the tube assembly can contain up to 1000 fibers or more, each ranging from 2 to 25 mm in diameter. Alternatively or in combination, the tubular membrane may be comprised a dense stabilized zirconia that is self-supporting rather than a thick film supported on a porous substrate.

In some implementations, the vapor stream that exits the oxygen separation region may contain about 2% hydrogen and 98% water vapor by volume, and this stream may be cooled by standard processes to a temperature between about 300° C. and 1000° C. This cooling process may include a heat exchanger that removes heat from the vapor stream and uses that heat to heat water vapor prior to entering or re-entering the inlet chamber. The cooled stream can then be passed through a hydrogen separation region containing, for example, hydrogen-specific separation membranes. The hydrogen separation membranes may be, for example, tubular membranes comprised of at least one of tantalum, niobium vanadium, or other metals through which hydrogen can diffuse, such as palladium and palladium alloys with silver and copper, for example. The membranes may each be a tube having approximately a 3-mm outside diameter and a 100- micron wall thickness. In some implementations, these tubes may have a thin film of palladium coated on one or both surfaces of the tube to facilitate catalytically hydrogen's entry into or exit from the membrane. For example, a tantalum tube that is 300 microns thick may be coated with approximately 1 micron of palladium on both the inner and outer surfaces. Here the palladium catalytically speeds up the surface reactions that both allow hydrogen to enter the tantalum on the feed side as well as exit the tantalum on the permeate side. For example, at 420° C. a tantalum membrane that is 500 microns thick and has 1 micron of palladium on the feed and permeate sides of the membrane may allow a hydrogen permeation rate of about 2 sccm per $cm^2$ of membrane surface area when the hydrogen partial pressure difference is 30 Torr. Alternatively or in combination, the tubes may include a cermet comprised, for example, of a mixture of palladium and alumina powders that have been pressed and sintered.

In order to transport un-reacted water vapor back to the inlet for another pass through the porous target, one or more inline fans, blowers, or compressors may be employed. The entire recirculating mechanism may reside entirely in the chamber or a first portion (e.g., a fan blade on an axle) may reside in the chamber and a second portion (e.g., motor) magnetically or physically coupled to the first portion may reside outside the chamber. In some implementations, a controller may monitor the pressure inside the chamber using a pressure gauge and actuate a valve to allow additional water vapor to enter, if the pressure decreases below a predefined threshold.

Some implementations may include one or more of the following advantages. Using sunlight as heat allows for a very efficient use of sunlight as opposed to, for example, photolytic processes, which are only sensitive to specific portions of the sun's spectrum. Using water as the feed stock instead of natural gas or methane is advantageous because substantially no $CO_2$, which is a greenhouse gas and contributes to global warming, is produced. In addition, fossil-fuel resources are limited. Using highly concentrated light allows for the size of the reaction region and therefore key processing equipment to be reduced in size because light is focused to a small area. In comparison, solar photovoltaic systems typically require the sunlight to be collected by a large area of expensive solar cells instead of relatively inexpensive light reflectors. Operating at a high pressure increases the partial pressure of the products and allows for effective separation by membrane separation systems. A multitude of tubular membranes combined with either a vacuum or sweep gas is used to produce a partial pressure gradient and thereby accomplish a high-temperature separation of oxygen and hydrogen. In comparison to sheets or plates, tubular membranes increase the membrane surface area and reduce membrane wall thickness while minimizing or otherwise reducing the volume occupied. The reduced volume enables very high solar concentrations and concomitant small spot sizes are used to reach very high temperatures. Performing a first product separation at thermolysis temperatures and a second product separation at a lower temperature allows the system to be operated without removing water from the system or cooling it excessively and it also allows for a lower temperature, and thereby the use of a more cost effective hydrogen membrane separation system. This also provides greater simplicity and thermal efficiency than previous schemes. Hydrogen as a fuel essentially has no environmental impact as opposed to, for example, gasoline which emits $CO_2$, smog components, and generally includes potent carcinogens that can leak from storage tanks into ground water. The disclosed process for producing hydrogen may be more economical than current approaches because some implementations disclosed below can use simple, existing technology (e.g., extruded ceramic tubing), inexpensive feed stock—water, a free power source—sunlight and/or a process for harvesting said sunlight that is low-cost (e.g., plastic optics). In addition, the disclosed process may be scalable to small systems. As a result, these systems may be economical even when configured as a small system because the hydrogen production can be easily moved to point-of-use locations. In these instances, these implementations can have a huge advantage as the designs eliminate or otherwise reduce substantial transportation and/or storage issues that come with large centralized hydrogen production facilities.

The details of one or more implementations of the implementation are set forth in the accompanying drawings and the description below. Other features, objects, and advantages of the implementation will be apparent from the description and drawings, and from the claims.

DESCRIPTION OF DRAWINGS

FIG. 2 is a flow chart illustrating an example method for generating hydrogen.

Like reference symbols in the various drawings indicate like elements.

DETAILED DESCRIPTION

Figure 1:
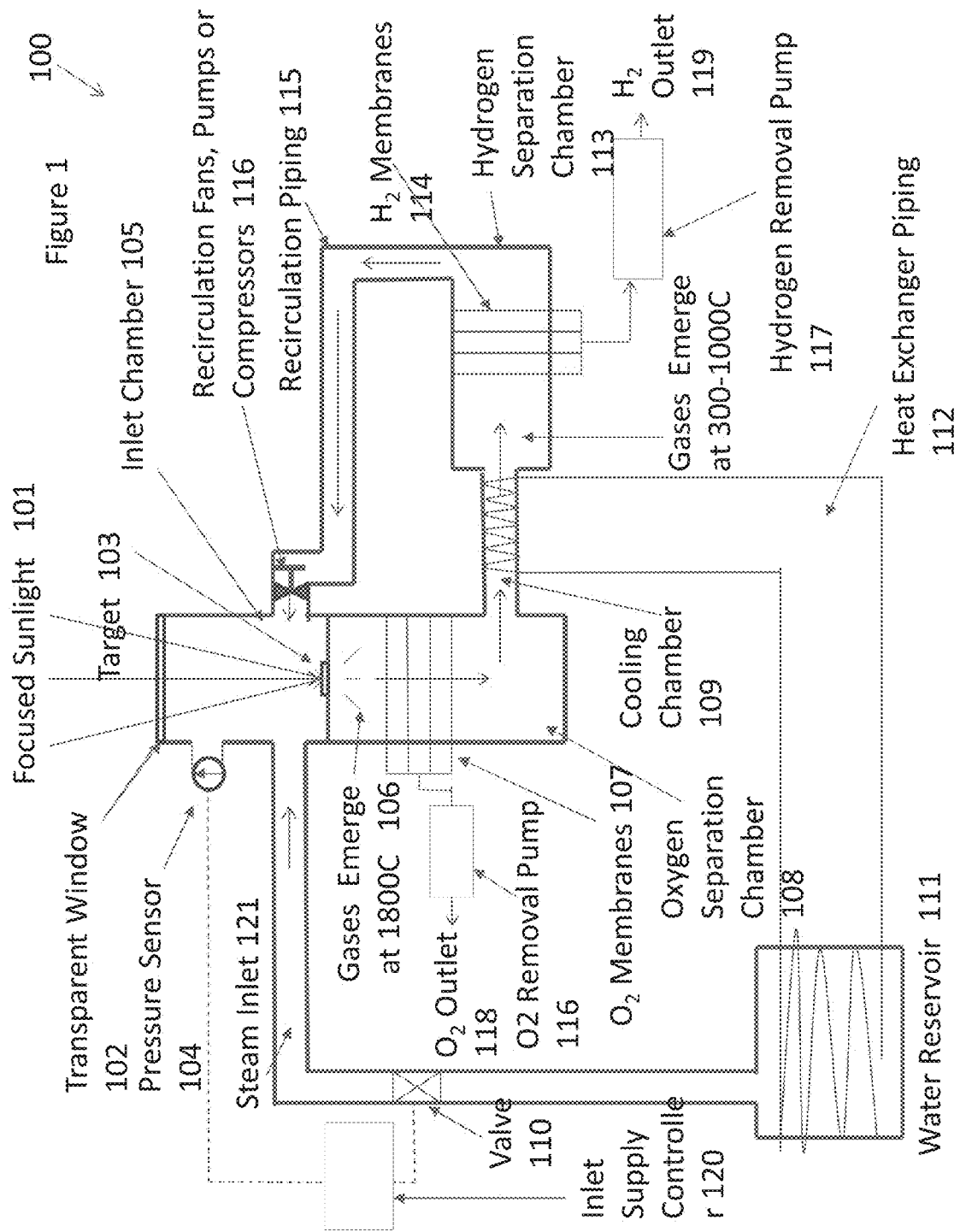
FIG. 1 is a block diagram illustrating an example hydrogen system in accordance with some implementations of the present disclosure.

FIG. 1 is a block diagram illustrating systems 100 for disassociating water and individually separating the oxygen and hydrogen therefrom. For example, the systems 100 may focus light on a target configured to absorb the incident energy and to be in thermal contact with water vapor such that the target generates sufficient heat to disassociate at least a portion of the water vapor into hydrogen and oxygen. In other words, the thermal energy that can break apart or otherwise disassociate water molecules and can be generated, in some implementations, by concentrating sunlight onto the target. For example, the system 100 may concentrate sunlight in the range of about 2,000-10,000 suns (e.g., 5,000) on a dark refractory material. In some implementations, the system 100 may include a plurality of concentrators (not shown) such as an array of mirrors or lenses to generate sufficient solar energy to heat the target. In doing so, the system 100 may convert at least a portion of incident solar energy to thermal energy sufficient to disassociate water. For example, the system 100 may concentrate solar energy on the target configured to both absorb at least a portion of the incident light (e.g., visible, ultraviolet) and generate sufficient thermal energy (e.g., about 1,800° C.) to disassociate water. In addition to disassociation, the system 100 can be configured to generate a hydrogen stream from the remaining components (e.g., hydrogen, oxygen, water vapor). For example, the system 100 may generate a differential in partial pressure across a selective membrane that selectively filters, for example, the oxygen to form a filtered stream at or near dissociation temperatures. The differential in partial pressure may be generated by passing a gas (e.g., inert gas) across the permeate side surface of the selective membrane and thereby sweep away the filtered gas or by using pumps to create a low pressure region on the permeate side and thereby draw away the filtered gas. In some implementations, the systems 100 may execute one or more of the following: focus sunlight on a light-absorbing target, pass water vapor through or by the heated target that has been heated sufficiently to disassociate at least some of the water vapor; selectively filter the oxygen at or near the disassociation temperature; cool the remaining vapors to a temperature suitable for separating the hydrogen from a filtered stream; and/or other process.

Referring to FIG. 1, the system 100 includes a transparent window 102 that allows focused sunlight 101 on a target 103 to heat the target 103 through or by which water vapor flows. The hot vapor stream that emerges from the target 103 has been heated to temperatures sufficient to disassociate at least some of the water. As a result, the hot vapor stream contains hydrogen, oxygen and water. That stream 106, still at or near the disassociation temperature, enters the oxygen separation chamber 108 and encounters oxygen separation membranes 107. The oxygen separation membranes 107 are heated by said flow and separate a portion of the oxygen through the walls to form a hydrogen-rich stream, that is one where there is a greater than stoichiometric amount of hydrogen relative to oxygen or where the hydrogen-to-oxygen ratio is greater than 2:1, and the oxygen removal pump 116 pumps the separated oxygen out of the oxygen separation membranes 107. The hydrogen-rich stream, now substantially devoid of oxygen, enters the cooling chamber 109, and the cooling chamber 109 cools the hydrogen-rich stream to a temperature suitable for hydrogen separation membranes 114 (e.g., between about 300° and 1000° C., depending on the membrane used). Some of the heat removed in cooling chamber 109 can be used to heat the source water in the water reservoir 111. The cooled stream enters a hydrogen separation chamber 113 including hydrogen separation membranes 114. The hydrogen separation membranes 114 separate at least a portion of the hydrogen through the membrane walls from the water-vapor stream, and the hydrogen removal pump 117 pumps the removed hydrogen from the hydrogen separation membranes 114. The hydrogen may be dried, purified and compressed (systems not shown). The remaining water-vapor stream enters a recirculation piping 115, and inline fans 116 convey the water-vapor stream back into the inlet chamber 105 and over to the target 103 for another pass through the production system 100. In some implementations, the water vapor stream is primarily steam and/or water. When water reacts to form products which then leave the system through oxygen membranes 107 and hydrogen membranes 114, a decrease in system pressure is detected by pressure sensor 104 which is electronically connected to inlet supply controller 120. When inlet supply controller 120 determines the pressure, as read by pressure sensor 104, dropped below a threshold, it opens valve 110 and allows the water reservoir 111 to re-pressurize the system 100 to, for example, a pressure of approximately 7600 Torr by directing additional water vapor through steam inlet 121 and into inlet chamber 105.

As for a more detailed description, the target 103 may include materials that have high melting points, such as zirconia and hafnia, which melt at 2700° C. and 2900° C., respectively. In addition, the materials may be resistant to oxidation because very high temperatures are generated for disassociation and superheated oxygen is very reactive. Additionally, the target 103 may include materials that are dark in color, which is typically effective at absorbing light and efficient at converting visible light to heat. In some implementations, the target 103 may include a white or lightly-colored oxide-based ceramic (e.g., zirconia, alumina, magnesia and/or hafnia) and may be mixed with, pressed with and sintered with dark colored metal oxides (e.g., $MnO_2$, $FeO_2$, $CoO$, and/or others) to form polycrystalline forms with sufficiently dark color as to substantially absorb sunlight. In addition to being unreactive with hydrogen, and oxygen and water at high temperatures and having a very high melting point, the target 103 may also have low thermal conductivity (e.g., about 2 Watts/Meter/° K or less) to minimize or otherwise reduce the loss of system heat from a reaction zone and/or simplify the system design. Disassociation of the water molecule is accomplished by direct thermal decomposition at high temperatures as illustrated in Equation 1.

When this reaction is in equilibrium, the fraction of water that is in a disassociated form is a function of several parameters such as temperature and pressure. In some implementations, the target 103 may generate or otherwise provide temperatures in excess of about 1800° C. in order to allow for appreciable disassociation of water. The system pressure can also be used to establish the amount of reaction products. For example, with a system pressure of 10 atmospheres (7,600 Torr) only about 1% of water is decomposed at 1800° C., but, at this operating pressure and temperature, a hydrogen partial pressure of 76 Torr and an oxygen partial pressure of 38 Torr exists, assuming equilibrium conditions. With a system pressure at 1 atmosphere (760 Torr), while 2% of the water will be decomposed at 1800° C. under equilibrium conditions, the hydrogen partial pressure would be 15.2 Torr and the oxygen partial pressure would only be 7.6 Torr. Since the permeation rate of these gasses through the separation membranes is directly proportional to the differential partial pressure across the membranes, starting with only 7.6 Torr of oxygen would result in about a 3-8 times slower separation rate, depending on the permeate-side pressure.

In some implementations, the target 103 for the focused sunlight 101 may be in the form of a nozzle. As previously mentioned, the target 103 generates sufficient heat to disassociate water vapor using the incident solar energy. The nozzle can be a pressed (or otherwise molded) and sintered ceramic body that is porous to allow water vapor to flow through it. In some implementations, at least portions of the nozzle may be resistant to thermal shock.

The oxygen separating membranes 107 may include materials that are known to selectively pass oxygen when there is an oxygen pressure gradient. For example, oxygen separating membranes 107 may include zirconia that has been stabilized partially or fully with yttria. Others materials include zirconia that has been stabilized with scandia, alumina, calcia, magnesia or combinations thereof or any other material or materials that, when combined with zirconia, creates oxygen vacancies in the lattice thereby allowing oxygen to pass through at high temperatures when a concentration or voltage gradient is present. Hafnia and thoria are two other examples of oxygen conducing materials that can be stabilized with calcia, scandia and the others, much like zirconia. Bismuth oxides can also conduct oxygen and are often stabilized with erbia, and others. Gadolinium oxide stabilized ceria is another prominent material capable of selectively passing oxygen. Another class of materials that selectively pass oxygen includes certain perovskites, for example, $BaCo_xFe_y Zr_{1-x-y}O_{3-\delta}$, $La_{0.6}Sr_{0.4}Co_{0.8}Fe_{0.2}O_3$ or $La_{0.9}Sr_{0.1}(Ga_{0.8}Mg0.2)O_{3-x}$. Any other materials that are oxygen selective materials with sufficient thermal, mechanical and chemical stability may be used as well. In order to maintain the oxygen concentration gradient to support the flow of oxygen produced in the system out to the storage area, a sweep gas can be used to physically remove the oxygen from the membrane. For example, an unreactive sweep gas such as argon may be passed through the permeate side of the oxygen separating membranes 107. Alternatively or in combination, a vacuum can be maintained on the permeate side of the oxygen separating membrane 107 by connecting a suitable vacuum pump 116. Using a vacuum pump 116 to ensure removal of oxygen from the system has certain advantages over the use of a sweep gas since no sweep gas has to be recovered and no heat is lost to the sweep gas. As long as the inner diameter of the oxygen membrane is sufficient (e.g., at least about 1 mm inner diameter, depending on the length of the membrane and the permeate side pressure) to allow enough conductance of the oxygen gas, using a vacuum pump to remove oxygen from the inside of the oxygen separation membrane 107 is both cost and thermally efficient. In some implementations, the oxygen separation membranes 107 may be u-shaped or close-ended to allow sufficient freedom to expand and contract freely due to high temperatures and possible non-uniform heating.

The hydrogen separating membranes 114 may include materials that are known to selectively pass hydrogen when there is a hydrogen gradient. For example, hydrogen separating membranes 114 may include tantalum that has been coated with palladium. Others materials include palladium coated niobium and palladium coated vanadium or combinations thereof or any other material or materials that allow hydrogen to pass through when a concentration gradient is present. Another class of materials that selectively pass hydrogen includes certain perovskites, for example, $SrCe_{0.95}Yb_{0.05}O_{3-\alpha}$. Another type of material that can be used as a hydrogen membrane are Cermets such as combinations of palladium and alumina. Any other materials that are hydrogen selective materials with sufficient thermal, mechanical and chemical stability may be used as well. In order to maintain the hydrogen concentration gradient to support the flow of hydrogen produced in the system out to the storage area, a sweep gas can be used to physically remove the hydrogen from the membrane. For example, an unreactive sweep gas such as argon may be passed through the permeate side of the hydrogen separating membranes 114. Alternatively or in combination, a vacuum can be maintained on the permeate side of the hydrogen separating membrane 114 by connecting a suitable vacuum pump 117. Using a vacuum pump 117 to ensure removal of hydrogen from the system has certain advantages over the use of a sweep gas since no sweep gas has to be recovered and no heat is lost to the sweep gas. As long as the inner diameter of the hydrogen membrane is sufficient (e.g., at least about 2 mm inner diameter, depending on the length of the membrane and the permeate side pressure) to allow enough conductance of the hydrogen gas, using a vacuum pump to remove hydrogen from the inside of the hydrogen separation membrane 114 is both cost and thermally efficient. In some implementations, the hydrogen separating membranes 114 may be u-shaped or close-ended to allow sufficient freedom to expand and contract freely due to high temperatures and possible non-uniform heating.

This implementation is for illustration purposes only and the separation membranes 107 and 114 may have other configurations without departing from the scope of this disclosure. For example, the separation membranes 107 and 114 may be curved or U-shaped such that the membranes enter and exit the same wall or an adjacent wall as opposed to an opposite wall. This configuration might help minimize or otherwise reduce thermal stresses associated with non-uniform heating. In addition, a seal may be formed between the oxygen separation membranes 107 and the oxygen removal chamber 108 as well as between the hydrogen removal membranes 114 and the hydrogen removal chamber 113 to substantially prevent leaks forming due to expansion and contraction. In these instances, the separation membranes 107 and 114 can seal-ably pass through the oxygen-removal-chamber walls and hydrogen-removal-chamber walls, respectively. As a result, the oxygen and hydrogen can be removed either by evacuating the permeate side of the separation membranes and/or by passing a sweep gas through the permeate side of the separation membranes. Whether sweep gas or vacuum is used, a very low partial pressure of oxygen, or hydrogen in the case of the hydrogen separation membranes, (e.g., approximately 3 Torr) is typically maintained on the permeate side of the membranes 107 and 114 because the membrane permeation process is driven by a partial pressure difference between the two sides of the membranes 107 and 114.

FIG. 2 is a flow chart illustrating an example method 200 for generating a hydrogen stream in accordance with some implementations of the present disclosure. The illustrated method is described with respect to system 100 of FIG. 1, but this method could be used by any other suitable system. Moreover, the system 100 may use any other suitable techniques for manufacturing the system 100. Thus, many of the steps in this flowchart may take place simultaneously and/or in different orders as shown. System 100 may also use methods with additional steps, fewer steps, and/or different steps, so long as the methods remain appropriate.

At a high level, method 200 includes the following processes: (1) heating a target using directed energy and exposing water vapor to the target heated to a water dissociation temperature in steps 201-204; (2) separating oxygen from partially-dissociated water vapor at or near the dissociation temperature in steps 205 and 206; (3) cooling the remaining gasses somewhat and separating hydrogen from the cooled gasses in steps 207 to 210; and (4) recirculating the remaining water vapor to the inlet chamber in step 211.

Method 200 begins at step 202 where water vapor enters an inlet chamber 105. For example, steam from a heated water reservoir 111 may be introduced into the inlet chamber 105. At step 203, focused sunlight 101 enters the inlet chamber 105 through the transparent window 102 and heats the target 103 to temperatures sufficient to at least partially decompose water vapor. For example, the target 103 may be heated to approximately 1800 C or greater. Next, at step 204, the target 103 heats the water vapor to dissociation temperatures. As previously mentioned, the heated target 103 can be porous and the target 103 heats the water vapor when passing through the pores. Turning to the process for generating an oxygen stream, in step 205, the partially-dissociated water vapor stream enters the oxygen removal chamber 108 and physically encounters of the oxygen permeable membranes 107 at or near dissociation temperatures. The walls of the oxygen permeable membranes 107 remove at least some of the oxygen at step 206. As for the example, oxygen is selectively filtered through the tubular oxygen separation membranes 107 and the oxygen removal pump 116 moves the oxygen out the outlet 118. At steps 207 and 208, some heat is extracted from the remaining gas stream so that the hydrogen separation membrane 114 will not be thermally degraded and at least a portion of this heat is used to preheat water vapor destined for the inlet chamber 105. For example, the system 100 may include a heat exchanger inside or coupled to the cooling chamber 109. Turning to the process for generating an oxygen stream, in step 205, the partially-dissociated water vapor stream enters the oxygen removal chamber 108 and physically encounters of the oxygen permeable membranes 107 at or near dissociation temperatures. The walls of the oxygen permeable membranes 107 remove at least some of the oxygen at step 206. As for the example, oxygen is selectively filtered through the tubular oxygen separation membranes 107 and the oxygen removal pump 116 moves the oxygen out the outlet 118. Turning to the hydrogen-stream process, the remaining gas stream enters the hydrogen separation chamber 113 and physically encounters a series of hydrogen permeable membranes 114. The walls of the hydrogen permeable membranes 114 remove at least some of the hydrogen enabling hydrogen removal step 210. Returning to the example, the hydrogen and water vapor enter the hydrogen separation chamber 113 at a temperature appropriate for the hydrogen separation membrane process and hydrogen is selectively filtered through the tubular hydrogen separation membranes 114 and the hydrogen removal pump 118 moves the hydrogen out the hydrogen outlet 119. For example, the appropriate temperature may be 400° C. for a membrane comprised of palladium-coated tantalum tubing. Next, at step 211, the remaining water vapor is fed back into the inlet chamber 105 to be processed again. The hydrogen stream is dried, purified, compressed and stored at step 212.

A number of implementations of the implementation have been described. Nevertheless, it will be understood that various modifications may be made without departing from the spirit and scope of the implementation. For example, the recirculated water vapor could be fed into the high pressure steam inlet pipe 121 rather than directly into the inlet chamber 105.

Many strategies may optimize or otherwise enhance the heat transfer from the target to the water vapor. For example, the target 103 may be a porous ceramic material, through which water vapor must pass in order to enter the oxygen separation chamber 108. In the case of the water vapor entering the oxygen separation chamber 108 through a ceramic nozzle that also serves as the light absorbing target 103, several candidate materials exist, including ceramic foams and fabrics. Indeed, the candidates may have a high thermal and chemical stability in the decomposition environment and be sufficiently porous to allow water vapor to pass at certain rate. A simple plate with holes formed in it may also serve as the ceramic inlet nozzle. Besides zirconia, some examples of other potentially useful materials include hafnia, alumina, yttria and ceria, and mixtures thereof. Besides proper material selection and reactor design, process conditions also help control the amount of hydrogen and oxygen that can be produced thermally from water.

Accordingly, other implementations are within the scope of the following claims.

What is claimed is:

1. A system for producing hydrogen and oxygen from water, comprising:
   a target that heats to at least a temperature that thermally decomposes water, receives water vapor, heats the received water vapor to the temperature that thermally decomposes water to form a heated vapor, and passes the heated vapor to an oxygen selective membrane, wherein the target includes an oxide-based refractory material mixed with a dark-colored metal oxide;
   the oxygen selective membrane that, at or near the temperature that thermally decomposes water, separates oxygen from the heated vapor to form a hydrogen-rich vapor;
   a cooling chamber that cools the hydrogen-rich vapor to at least a specified temperature; and
   a hydrogen selective membrane that separates hydrogen in the hydrogen-rich vapor to leave substantially water vapor.

2. The system of claim 1, further comprising inline fans, blowers or compressors to re-circulate un-reacted water vapor, un-separated hydrogen, and un-separated oxygen back through or past the target.

3. The system of claim 1, wherein the target comprises stabilized zirconia.

4. The system of claim 3, wherein the stabilized zirconia is darkened by combining a dark transition metal oxide powder prior to molding and sintering.

5. The system of claim 1, wherein the water vapor is thermally decomposed at a temperature of at least 1800° C. and a pressure of at least about 10 atmospheres.

6. The system of claim 1, wherein focused sunlight heats the target to the temperature that thermally decomposes water.

7. The system of claim 1, wherein the oxygen selective membrane comprises stabilized zirconia.

8. The system of claim 1, wherein the hydrogen selective membrane comprises at least one of palladium coated tantalum, vanadium, niobium, a cermet that contains palladium, silver, or copper.

9. The system of claim 8, wherein the specified temperature is 400° C. or less.

10. The system of claim 1, wherein the temperature that thermally decomposes water and a temperature that the oxygen is removed is at least 1800° C.

11. The system of claim 1, further comprising:
    an inlet chamber including the target;
    a water reserve that passes water vapor to the inlet chamber; and
    a heat exchanger that passes heat from the cooling chamber to the water reserve.

12. The system of claim 1, wherein the target includes at least one of a ceramic fabric darkened with one or more dark metal oxides, a pressed disk made porous by particle size and sintering condition selection, or a machined part with holes.

13. The system of claim 1, wherein the oxygen selective membrane comprises at least one of the following perovskites $BaCo_xFe_yZr_{1-x-y}O_{3-\delta}$, $La_{0.6}Sr_{0.4}Co_{0.8}Fe_{0.2}O_3$ or $La_{0.9}Sr_{0.1}(Ga_{0.8}Mg_{0.2})O_{3-x}$.

14. The system of claim 1, further comprising:
    an inlet chamber including the target;
    a water reserve that passes water vapor to the inlet chamber; and
    a heat exchanger that passes heat from the cooling chamber to the water reserve.

* * * * *

UNITED STATES PATENT AND TRADEMARK OFFICE
CERTIFICATE OF CORRECTION

PATENT NO. : 9,321,644 B2
APPLICATION NO. : 14/201554
DATED : April 26, 2016
INVENTOR(S) : Jerome Lee Elkind It is certified that error appears in the above-identified patent and that said Letters Patent is hereby corrected as shown below:

Column 8, Line 55, delete "$(Ga_{0.8}Mg0.2)O_{3-x}$." and insert -- $(Ga_{0.8}Mg_{0.2})O_{3-x}$. --.

Column 12, Line 46-47, In Claim 13, delete "BaCoxFeyZr1-x-yO3-δ, La0.6Sr0.4Co0.8Fe0.2O3 or La0.9Sr0.1(Ga0.8Mg0.2)O3-x." and insert -- $BaCo_xFe_yZr_{1-x-y}O_{3-\delta}$, $La_{0.6}Sr_{0.4}Co_{0.8}Fe_{0.2}O_3$ or $La_{0.9}Sr_{0.1}(Ga_{0.8}Mg_{0.2})O_{3-x}$. --, therefor.

Signed and Sealed this
Twenty-eighth Day of June, 2016

Michelle K. Lee
*Director of the United States Patent and Trademark Office*